UNITED STATES PATENT OFFICE.

GUSTAV THURNAUER, OF AURORA, ILLINOIS.

PROCESS OF SEPARATING PRECIOUS METALS FROM THEIR MIXTURES WITH ZINC.

SPECIFICATION forming part of Letters Patent No. 642,767, dated February 6, 1900.

Application filed June 7, 1899. Serial No. 719,738. (No specimens.)

*To all whom it may concern:*

Be it known that I, GUSTAV THURNAUER, a citizen of the United States, residing at Aurora, in the county of Kane and State of Illinois, have invented certain new and useful improvements in the process of separating the precious metals from the mixture of zinc and the precious metals resulting from the treatment of cyanid solutions of the precious metals by zinc; and I do hereby declare that the following is a full, clear, and exact description of my invention, which will enable others skilled in the art to which it appertains to make and use the same.

Heretofore there have been chiefly two methods in use for separating the precious metals from the mixture of zinc and the precious metals resulting from the treatment of cyanid solutions of the precious metals by zinc. The crushed ores are first treated with a solution of an alkali cyanid, which dissolves the precious metals, forming cyanids of the same. The cyanid solution of the precious metals is then treated with metallic zinc in such a manner that the precious metals are precipitated upon the zinc, and a mixture of the precious metals and zinc is obtained. This mixture is then separated from the solution containing it, and after being washed is now treated by one of two general methods. The first of these methods consists in drying the mixture of zinc and the precious metals and then subjecting it to an oxidizing process, generally with the aid of niter and certain fluxes. The regulus so obtained is refined by one of the well-known metallurgical processes. The disadvantage of this process of separating the precious metals consists in the losses of precious metal which occur through the carrying off of part of it as dust with the fumes of zinc oxid formed in the refining.

The second principal method of treating the mixture of precious metals and zinc is based upon the solubility of zinc in sulfuric or hydrochloric acid. The mixture of zinc and precious metals is treated in a tank with sulfuric or hydrochloric acid, by which the zinc is dissolved and zinc sulfate or zinc chlorid is formed, while hydrogen gas is evolved from the solution and passes off. The precious metals are then separated from the solution of zinc salts by decantation and filtration and dried and refined by one of the well-known metallurgical processes. This method has the disadvantage of reducing the residues of precious metal to a very finely divided state, which causes difficulty in decantation because of slow settling of the metal and in filtration by reason of the clogging of the filters, besides causing losses of precious metal by "dusting" on account of the finely-divided state of the residue when subjected to final process of refining.

By means of my invention the losses of precious metals are minimized without proportionate increase in the cost of refining, the time necessary to separate the precious metals from the mixture of zinc and precious metals is materially decreased, and the cleanliness and accuracy of the separation is greatly increased.

To this end my invention consists in treating the mixture of zinc and precious metals resulting from the treatment of cyanid solutions of the precious metals by zinc with a solution of some salt of lead, preferably a solution of lead acetate, although any solution of lead can be used.

The mixture of zinc and precious metals is first washed, then placed in tanks, and the solution of lead, preferably, as stated, a solution of lead acetate, is added. The chemical action resulting is the solution of the zinc by its combination with the acid portion of the lead salt and the precipitation of metallic lead. After precipitation of lead is ended I add free acid, preferably acetic acid, which dissolves the basic salts which may have been formed and also the zinc which may not have been previously dissolved by the action of the lead solution. The process described can be carried on at ordinary temperature, but 50° to 100° centigrade is preferable. The precipitate of lead formed, as described, is heavy and flocculent, mixes intimately with the precious metals, and sinks to the bottom of the tanks. The mixture of lead and the precious metals is now separated from the solution by decantation and filtration, pressed and dried, and melted into a regulus, or, if desired, cast into bars whose value can be obtained with precision and which can readily be refined.

The advantages of my invention consist, in part, of the ease with which the mixture of zinc and precious metals is transformed into a mixture of lead and precious metals, which produces a compact mixture, easily refined without loss of the precious metals, as stated. By the present method, in which the mixture of zinc and precious metals is oxidized, the flues of the furnaces used in the oxidation carry off as dust a comparatively large amount of the precious metals, which is lost unless the flues are cleaned at intervals to recover such losses. By my invention the loss of precious metal is so small as to be unimportant. By the present "wet" method of refining mixtures of zinc and the precious metals, as before described, the time consumed in recovering the precious metals is considerable and the lack of cleanliness and accuracy in the process is such as to make it undesirable, besides which in the final refining of the dried mixture of precious metals resulting from such process there is considerable loss through the carrying off of particles of precious metals as dust. By my improved process all of the precious metal is retained, and cleanliness, accuracy, and neatness, compared to present processes, are increased.

Another advantage of my invention lies in the fact that the lead salts and acids used can be recovered and again used. For this purpose the solution of zinc salts composing the final solution in my process is treated with some inexpensive acid or decomposed by some other suitable method, by which treatment the original acid and the zinc used may be recovered, if such recovery is desirable from the standpoint of economy. The lead oxid may also be recovered for renewed use by oxidizing the lead contained in the final mixture of lead and precious metal.

Having fully described my invention, what I claim, and desire to secure by Letters Patent, is—

1. The herein-described process of treating the mixture of zinc and precious metals resulting from the treatment of cyanid solutions of the precious metals by zinc, which consists in subjecting said mixture to the action of a solution containing lead, whereby the zinc is dissolved and the precious metals remain in admixture with metallic lead.

2. The herein-described process of treating the mixture of zinc and precious metals resulting from the treatment of cyanid solutions of the precious metals by zinc, which consists in subjecting said mixture to the action of a solution containing lead and then to the action of acid, whereby the zinc is dissolved and the precious metals remain in admixture with metallic lead.

3. The herein-described process of treating the mixture of zinc and precious metals resulting from the treatment of cyanid solutions of the precious metals by zinc, which consists in subjecting said mixture to the action of a solution of lead acetate whereby the zinc is dissolved and the precious metals remain in admixture with metallic lead.

4. The herein-described process of treating the mixture of zinc and precious metals resulting from the treatment of cyanid solutions of the precious metals by zinc, which consists in subjecting said mixture to the action of a solution of lead acetate and then to the action of acetic acid, whereby the zinc is dissolved and the precious metals remain in admixture with metallic lead.

GUSTAV THURNAUER.

Witnesses:
AUTHUR M. PECK,
F. W. WHEELER.